United States Patent
Vondracek et al.

(10) Patent No.: US 7,828,918 B2
(45) Date of Patent: Nov. 9, 2010

(54) METHOD FOR THERMOMECHANICAL TREATMENT OF STEEL

(75) Inventors: Hans Vondracek, Brekerfeld (DE); Hans DziemBalla, Iserlohn (DE); Lutz Manke, Hagen (DE); Alexander Borowikow, Sydower Fliess (DE); Reinhard Uhrich, Berlin (DE); Matthias Hüttner, Strassberg (DE)

(73) Assignee: ThyssenKrupp Automotive AG, Bochum (DE)

( * ) Notice: Subject to any disclaimer, the term of this patent is extended or adjusted under 35 U.S.C. 154(b) by 343 days.

(21) Appl. No.: 10/551,537

(22) PCT Filed: Mar. 5, 2004

(86) PCT No.: PCT/EP2004/002281

§ 371 (c)(1),
(2), (4) Date: Sep. 14, 2005

(87) PCT Pub. No.: WO2004/087968

PCT Pub. Date: Oct. 14, 2004

(65) Prior Publication Data

US 2006/0231175 A1    Oct. 19, 2006

(30) Foreign Application Priority Data

Apr. 4, 2003    (DE)    ................... 103 15 418

(51) Int. Cl.
C21D 8/06    (2006.01)
(52) U.S. Cl. .................................... 148/598
(58) Field of Classification Search ................ 148/598, 148/572, 580
See application file for complete search history.

(56) References Cited

U.S. PATENT DOCUMENTS 2,261,878 A * 11/1941 Hathaway .................. 148/576

(Continued)

FOREIGN PATENT DOCUMENTS

DE    43 40 568    6/1995

(Continued)

OTHER PUBLICATIONS

Borowikow et al., Machine Translation of DE 10030823, Three-roller cross-rolling mill used for reducing the diameter of metal rods by hot or cold working has rollers having a conical contour divided into a gripping, shaping and smoothing zone, Jan. 17, 2002.*

(Continued)

*Primary Examiner*—Roy King
*Assistant Examiner*—Jie Yang
(74) *Attorney, Agent, or Firm*—Crowell & Moring LLP

(57) ABSTRACT

The invention relates to a method for the thermomechanical treatment of steel. According to said method, the parent material is heated to a temperature in excess of the re-crystallization temperature, the structure is austenitized, held at an equalized temperature and then formed and subsequently quenched to form martensite and tempered. Round steel bars, whose re-crystallization temperature is adjusted over the bar length in a compensation furnace, constitute the parent material. The round steel bars are subsequently re-modeled by cross-rolling, remaining substantially straight and after the critical deformation degree has been exceeded are subjected to dynamic re-crystallization processes. The round steel bars are then subjected to a post-heating process above the Ac3 temperature, in order to undergo a complete static re-crystallization and finally are quenched from the austenitic state to form martensite and tempered.

22 Claims, 1 Drawing Sheet

U.S. PATENT DOCUMENTS

| | | | |
|---|---|---|---|
| 3,988,915 A * | 11/1976 | Jonge Poerink | 72/144 |
| 4,798,071 A * | 1/1989 | Staat et al. | 72/97 |
| 5,873,960 A * | 2/1999 | Kondo et al. | 148/593 |
| 5,938,865 A * | 8/1999 | Kondo et al. | 148/593 |
| 6,341,767 B1 * | 1/2002 | Seale et al. | 267/169 |
| 6,372,056 B1 * | 4/2002 | Kuroda et al. | 148/320 |
| 6,458,226 B1 * | 10/2002 | Bilgen et al. | 148/567 |

FOREIGN PATENT DOCUMENTS

| | | | |
|---|---|---|---|
| DE | 195 46 204 C1 | | 3/1997 |
| DE | 196 37 968 | | 5/1998 |
| DE | 19839383 | * | 1/2000 |
| DE | 10030823 | * | 1/2002 |
| JP | 2002-254103 (A) | | 9/2002 |

OTHER PUBLICATIONS

Fritz et al (NPL "Fertibungs Technik" (Manufacturing Technology) 1995, and English translation for Fig.5-24 and 5-26).*

Machine translation of JP 2002254103 A (Sep. 2002).*

* cited by examiner

METHOD FOR THERMOMECHANICAL TREATMENT OF STEEL

The invention relates to a method for the thermomechanical treatment of steel.

BACKGROUND OF THE INVENTION

German patent document DE 43 40 568 C2 describes a method for the continuous heat treatment of steel wire, which comprises the following steps:

- Rapidly heating the wire to a temperature in the austenitic range at a rate between 85° and 100° C./s;
- Holding the steel wire in the austenitic range for a period of 10 to 60 s;
- Quenching the steel wire to room temperature at a rate >80° C./s;
- Rapidly heating to the drawing temperature at a rate of 85° to 95° C./s;
- Holding at the drawing temperature for a period of 60 to 100 s;
- Cooling the wire at a rate of >50° C./s common for water cooling.

Between steps 2 and 3, the wire can be rolled at a temperature just above the Ac3 temperature, the wire being ovalized in a first pass, rolled round in the second pass, and thereafter drawn through a gauging die.

In German patent document DE 195 45 204 C1, a method is described for the manufacture of high-strength objects from a quenched and temperature steel and for using this process for the production of springs. The steel with (in weight %) 0.4 to 0.6% C, up to 1% Si, up to 1.8% Mn, 0.8 to 1.5% Cr, 0.03 to 0.10% Nb, 0.0.2% V, the remainder being iron, is to be treated as follows:

- The raw material is solution annealed in the austenitic region at temperatures of 1050° to 1200° C.;
- Immediately thereafter the raw material is shaped hot at a temperature above the recrystallization temperature in a first step;
- Immediately thereafter the raw material is hot-formed at a temperature below the recrystallization temperature, but above the Ac3 temperature in a second step;
- The rolling product is then held at a temperature above the Ac3 temperature for the performance of additional transformation and working processes, and thereafter cooled to below the martensite temperature, whereupon it is then tempered.

In DE 196 37 968 C2, a method is to be found for the high-temperature thermomechanical manufacture of spring leaves for leaf springs and/or leaf spring control arms, is the method being based on a two-step thermomechanical method of manufacturing parabolic springs, which is based on the following steps:

- The starting material is heated at a heating rate between 4° C./s and 30° C./s to the austenitizing temperature;
- The austenitizing temperature is 1100°±100° C.,
- The material is cooled from the austenitizing temperature to the temperature of the first rolling stage at a cooling rate between 10° C./s and 30° C./s.
- Then, in the first rolling step, at a temperature of 1050°±100° C., with a non-constant changing of shape between 15% and 80%, it is roughed down in one or more passes.
- In the second rolling step, it is finish-rolled with rolls adjustable under load, at a temperature of 880°±30° C. with a change of shape between 15% and 45% over the length of the leaf spring.

Finally, German patent document DE 198 39 383 C2 discloses a method for the thermomechanical treatment of steel for torsionally stressed spring elements, wherein the starting material is worked at a temperature above the recrystallization temperature and then reshaped at such a temperature above the recrystallization temperature in at least two transformation steps that a dynamic and/or static recrystallization of the austenite results. The recrystallized austenite of the converted product is quenched and annealed. A silicon-chromium steel is to be used, having a carbon content of 0.35 to 0.75%, which is microalloyed with vanadium or other alloying element.

The methods to be taken from the state of the art for the thermomechanical treatment of steel are based essentially on multiple converting steps, repeated cooling and heating of the staring material being necessary in order to produce the parameters obtained later on in the end product.

SUMMARY OF THE INVENTION

It is an object of the invention to make a method available for the thermomechanical treatment of steel, which method permits a targeted improvement in the property parameters directed to the loading profile of the end product.

For the inventive method, the starting material is first heated to a temperature above the recrystallization temperature and subsequently the temperature is equalized over the entire length of the rod. Furthermore, the temperature to which the rod is heated, is kept constant virtually up to the entry of the rod into the roll gap. With these working steps a highly uniform structure of the rod is sought, both over its length and through its cross section, before it enters the roll gap, which is of advantage for the transformation process that follows. On account of the process-specific peculiarities of the skew rolling and due to a targeted establishment of the rolling parameters, a predetermined twisting of the material in the marginal area of the rods and a transformation gradient over the cross section of the rod set in. Since the direction of transformation during the skew rolling is at an angle to the axis of the material and the maximum of the transformation is in the marginal region of the rods, the structural stretching in this marginal zone, caused by the transformation, is especially greatly pronounced and the structural alignment corresponds to the transformation direction and also extends at an angle to the axis of the tolled material. After the critical degree of transformation is exceeded, the dynamic recrystallization process takes place with special intensity in this marginal zone, so that a gradient of the degree of recrystallization from the outside to the inside may be noted over the cross section of the rod. In the reheating, following the transformation process to a temperature above Ac3, the static recrystallization is completed and leads to the formation of fine-grained austenite, especially in the marginal zone. After hardening followed by tempering, the marginal zone is characterized by a martensite structure of great strength.

The invention has considerable advantages over the solutions known from the state of the art. As a result of the combination of a targeted, one-step transformation by means of skew rolling and a heat treatment coordinated therewith, the treated rods have a strength profile on their cross section, which reaches its maximum values in the marginal area. The direction of the twist of the structure produced by the skew rolling in the marginal region of the round rods corresponds to the main direction of stress of a component subjected to torsion, and the properties developed by the rods as a result thus provide optimum prerequisites for their use especially in the spring industry. The distribution of structures over the cross section of the rod produced by the inventive method results in a property profile, which is adequate for the stress profile over the cross section of the rod during bending and torsional stresses.

Since only a transformation step is necessary for the development of these advantageous strength effects, and the working steps that follow are performed essentially at an elevated temperature, only a heating process for the starting material is therefore necessary. This leads to considerable savings of energy and time resulting from the procedure itself The inventive method is distinguished therefore from known methods not only by an improvement in the stress-oriented strength and toughness properties of the finished product, but also by economic advantages offered by the minimal number of process steps.

Advantageously, the starting material, in the form of round rods, is heated inductively at a rate of 100 to 400° K./s to a temperature between 700° and 1100° C. Subsequently, the heating temperature of the rod is equalized over its length during a period of at least 10 seconds. With that, it is assured that the temperature difference does not exceed 5° K. over the length of the rod. By means of reheating equipment, the heating temperature of the rod is kept constant until it enters the roll gap. The transformation itself is performed by skew rolling in a single step, in which the rods run uniformly straight through the roll gap. Depending on the quality of the starting material, the transformation is carried out in a temperature range of 700°-1150° C. The ratio of the starting diameter to the finished diameter is selected so that the skew rolling of the rods is performed with a mean degree of stretching λ of more than 1.3, and that the maximum transformation amounts to ψ=0.3. By the targeted setting of the rolling parameters, such as rotational speed and rate of feed, and by the special choice of roll contours with specific angular relationships, it is brought about that the maximum transformation in the marginal region is between 0.65 and 1.0 of the diameter of the rods, and that a desired transformation gradient is established over the cross section. Preferably, the skew rolling process is controlled so that a maximum local temperature increase of 50° K. is not exceeded in the rolled material.

Due to the transformation action, after a critical transformation degree is exceeded, dynamic recrystallization processes take place, which, on account of the maximum transformation, are more strongly pronounced in the marginal zone than in the core region of the rods. The targeted control of the transformation gradient over the cross section of the rod has the result that the first indications of a differential structure distribution appear across the cross section of the rod already during the course of the dynamic recrystallization. Thus, metallographic studies on rods in the recrystallized state, which have been rolled pursuant to the invention, show that the proportion of fine austenite crystals decreases clearly from the marginal zone toward the core region.

The differentiated structural formation across the cross section of the rolled material is furthermore additionally intensified by a typical peculiarity of skew rolling. Since the direction of transformation runs at an angle to the direction of the rolled material in skew rolling, a striking stretching of structure occurs especially in the marginal areas of the material due to the greater degree of transformation. The structure is also stretched at an angle to the axis of the rolled material and leads to a twisting of the material in the marginal zones. In the course of the inventive process, the direction of the twisting of the structure in the marginal region of the rods is 35 to 65 degrees of angle with respect to the longitudinal axis of the rod and thus corresponds to the main direction of stress of a component subjected to torsion.

In the process of single-step skew rolling shown, the rod being rolled runs on its entire length through a roll gap with a diameter remaining uniform over the entire length of the rod. This procedure is selected whenever rods with uniform diameter over their entire length are to be produced. The inventive method furthermore makes an alternative variation of the process possible, in which the roll gap geometry is varied in the operating state while the rod is passing though the roll gap. This flexible manner of operation is achieved with a skew roll stand, the rolls of which can be adjusted in the axial and/or radial direction as needed during the transformation. The inventive method thus permits round rods to be produced, the diameter of which varies over the length of the rods.

Immediately after they exit from the roll stand, the skew-rolled rods are subjected to reheating at a temperature above Ac3 in such a manner, that the temperature difference over the length of a rod is limited to 5° K.

Depending on their later intended use, the rods, skew-rolled and reheated to the recrystallization temperature, are coiled hot either to form coil springs or bent to form a stabilizer.

The coiled or bent components are then hardened and afterward tempered.

Rods, which are intended for manufacturing torsion bar springs, are mechanically worked at their ends in the cold state after reheating, then heated to above Ac3, quenched and tempered.

Macro-examinations of the finished rods show a typical distribution of structures over the cross sections of the rods as a consequence of the inventive combination of skew rolling and heat treatment. The immediate marginal zone has fine-grained martensite structure of high strength The marginal area has a continuous structure extending at an angle to the axis of the rod, the direction of twist corresponding to the main direction of tension of a torsionally stressed component. The mixed pearlite-martensite structure of the characteristic zone is coarser than the structure in the marginal area and exhibits no twisting phenomena.

To provide optimum toughness and strength parameters in the finished product, round rods of spring steel, preferably silicon-chrome steels with carbon contents <0.8%, are used as starting material in the inventive method. Alternatively, these steels can be micro-alloyed with vanadium or niobium.

The inventive object is represented by an embodiment in the drawing and is described as follows.

BRIEF DESCRIPTION OF THE DRAWINGS

The sole FIGURE shows the diagrammatic arrangement of a continuous working line for the inventive thermomechanical treatment of round steel rods of a silicon-chrome steel.

DETAILED DESCRIPTION OF THE INVENTION

Figure 1:
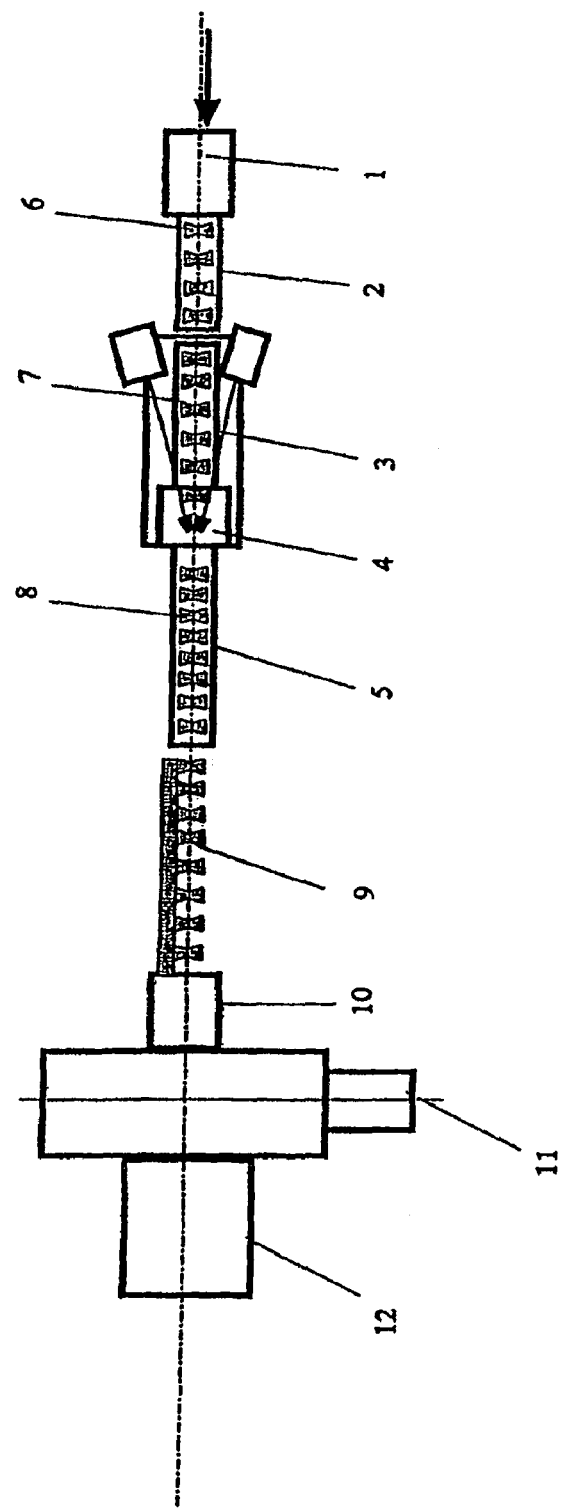

The rods to be treated are heated in an induction apparatus 1 to a temperature above the recrystallization temperature, while its structure is austenitized. In the present example, the round steel rods are heated at a rate of 130° K./s to a temperature of 980° C. In an equalization furnace 2 following the induction apparatus 1, the heating temperature of the rods is equalized for a period of 15 s, so that the temperature curve over the length of the rods has a gradient of 4° K.

In this state the round steel rods, now at uniform temperature, are brought into a holding oven 3 to keep their temperature constant until they enter the roll gap. The heated rods are transported by means of gang rolls 6 and 7, both in the equalizing oven 2 and in the holding oven 3.

In a skew rolling stand 4, the round steel rods, heated to 980° C., are shaped in a rolling step. At the same time the ratio of starting diameter to finish diameter is chosen so that the average degree of stretching $\lambda$ is 1.5 and that the maximum transformation $\psi$ is at least 0.3. By the targeted setting of rolling parameters, such as the roller speed or the rate of feed and by the special selection of rolling shapes with specific angular relationships, the maximum transformation in the marginal region between 0.65 and 1.0 of the diameter of the rods is achieved and thus a desired transformation gradient is established over the rod's cross section. The rolling parameters are coordinated with one another so that a maximum local temperature elevation of 50° K. is not exceeded in the material due to the transformation process. The direction of transformation at an angle to the rolling axis during the skew rolling produces in the marginal regions of the material rolled a pronounced stretching of its structure because of the greater transformation. Corresponding to the direction of transformation, this stretching of structure likewise runs at an angle to the axis of the rolled material and, in the marginal regions of the rods, results in a twisting of the material. In the course of the inventive process, the direction of the twisting of the structure, with respect to the longitudinal axis of the rods, amounts to 35 to 65 degrees of angle and thus corresponds to the main direction of stress of a component subjected to torsion.

After they exit from the skew rolling stand 4, the rolled rods pass into a downstream reheating furnace 5, in which they are reheated above the Ac3 temperature to assure complete static recrystallization. The rods are transported through the reheating furnace 5 by means of a roller conveyor 8. After leaving the reheating furnace 5 the skew-rolled rods are carried away on transfer roller conveyors 9. From this transfer roller conveyor 9 the rods are delivered to the rest of the intended processing steps.

FIG. 1 diagrammatically shows a production line for producing wound coil springs. Accordingly, the rods are passed over the transfer roller conveyor 9 to a lift table 10 and pass from there into a CNC winding bench 11 where the hot winding to coil springs takes place after the recrystallization After the winding process, the rods, now wound into coil springs, are transferred to a hardening vat 12, in which they are quenched and their structure is converted to martensite. The hardened coil springs are then subjected to a tempering treatment, which is not shown.

LIST OF REFERENCE NUMBERS

1. Induction apparatus
2. Equalization furnace
3. Holding Oven
4. Skew rolling stand
5. Reheating furnace
6. Gang rolls
7. Gang rolls
8. Gang rolls
9. Transfer roller conveyors
10. Lift table
11. CNC winding bench
12. Hardening vat

The invention claimed is:

1. A method for thermomechanical treatment of a round steel rod, said method comprising:
    deforming said steel rod in a single deforming step, coordinated with heat treatment of said steel rod, wherein said single deforming step, coordinated with heat treatment, includes,
    heating said steel rod to a heating temperature that is above a recrystallization temperature;
    equalizing the heating temperature of the steel rod over its length;
    causing said steel rod to be deformed by a single step of skew rolling while it remains substantially straight, such that a predetermined twisting of the material occurs in a marginal area of said rod and a desired deformation gradient is achieved over a cross section of the rod, whereby, after a critical degree of deformation is exceeded, dynamic recrystallization processes take place with test intensity in the marginal area;
    reheating the rod to a temperature above Ac3; and
    hardening and tempering the rod;
    wherein the structural distribution over the cross section of the finish-worked round rod leads to a property profile, which is adequate for the tension profile over the cross section in the case of flexural and/or torsional stress.

2. A method for hot forming a steel coil spring or stabilizer, said method comprising:
    using a round steel rod as a starting material;
    deforming said steel rod in a single deforming step, coordinated with heat treatment of said steel rod, wherein the single step of deforming, coordinated with heat treatment includes,
    heating said steel rod to a heating temperature that is above a recrystallization temperature;
    equalizing the heating temperature of the steel rod over its rod length;
    causing said steel rod to be deformed by a single skew rolling step while it remains substantially straight, such that a predetermined twisting of the material occurs in a marginal area of said steel rod and a desired deformation gradient is achieved over a cross section of the rod, whereby after a critical degree of deformation is exceeded, dynamic recrystallization processes take place with greatest intensity in the marginal area;
    reheating the rod to a temperature above Ac3;
    hot winding the rod to form a coil spring or bending it into a stabilizer; and
    hardening and tempering the wound or bent rods.

3. The method of claim 2, wherein:
    said skew rolling is performed in a skew rolling stand;
    rolls of the skew rolling stand are adjusted in one of an axial and a radial direction during the deformation operation; and
    round rods are produced with a diameter which varies over their length.

4. The method of claim 2, wherein during reheating above Ac3 following skew rolling, a temperature difference over the rod length is limited to a maximum of 5° K.

5. The method of claim 2, wherein the winding and/or a bending is performed in the same heat after recrystallization and before the hardening and tempering.

6. The method according to claim 2, wherein a direction of the twisting of the structure in the marginal region of the round rod corresponds to a main direction of tension of the coil spring or the stabilizer stressed by torsion.

7. The method of claim 2, wherein a direction of twisting of the structure in the marginal region of the rod is oriented with respect to the axis of the round rod, within a range of 35° - 65°.

8. The method of claim 2, wherein the skew rolling of the rod is performed with an average degree of stretching λ of at least 1.3.

9. The method of claim 2, wherein a maximum deformation occurs in the marginal area of the rods that lies between 0.65 and 1.0 times the diameter of the rod and is at least 0.3.

10. The method of claim 2, wherein, in said heating step, the material is heated at a rate between 100° - 400° K/s.

11. The method of claim 2, wherein, in said heating step, the heating temperature is between 700° and 1100° C.

12. The method of claim 2, wherein, in said heating step, the heating is performed inductively.

13. The method of claim 2, wherein the equalization of the heating temperature of the rod takes place for at least 10 seconds.

14. The method of claim 2, wherein a temperature difference over the length of the rod does not exceed 5° K.

15. The method of claim 2, wherein, during the skew rolling, a maximum local temperature increase of 50° K. is not exceeded.

16. The method of claim 2, wherein the skew rolling is performed in a temperature range of 700° - 1150° C.

17. The method of claim 2, wherein, during the reheating step, a temperature difference over the rod length is limited to a maximum of 5° K.

18. The method of claim 2, wherein the starting material of the rods is spring steel.

19. The method of claim 2, wherein the starting material of the rods is silicon-chromium steel.

20. The method of claim 2, wherein the starting material of the rods is microalloyed steel.

21. The method of claim 2, wherein:
   the skew rolling is performed in a skew rolling stand;
   rolls of the skew rolling stand are adjusted in one of an axial direction and a radial direction during the transformation operation; and
   the round rods are produced with a diameter, which varies over their length.

22. The method of claim 21, where the heating temperature of the rod is kept constant virtually up to its entry between said roll of said skew rolling stand.

* * * * *